US011768542B1

(12) United States Patent
Dani et al.

(10) Patent No.: US 11,768,542 B1
(45) Date of Patent: Sep. 26, 2023

(54) COMPUTING DEVICE WITH HAPTIC TRACKPAD

(71) Applicant: Microsoft Technology Licensing, LLC, Redmond, WA (US)

(72) Inventors: Adwaita Anil Dani, Redmond, WA (US); Donghwi Kim, Kirkland, WA (US); Federico Zannier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/932,181

(22) Filed: Sep. 14, 2022

(51) Int. Cl.
| *G06F 3/01* | (2006.01) |
| *G06F 3/044* | (2006.01) |
| *G06F 3/041* | (2006.01) |
| *G06N 20/00* | (2019.01) |
| *G06F 3/0354* | (2013.01) |

(52) U.S. Cl.
CPC .......... *G06F 3/016* (2013.01); *G06F 3/03547* (2013.01); *G06F 3/044* (2013.01); *G06F 3/0416* (2013.01); *G06N 20/00* (2019.01); *G06F 2203/04105* (2013.01)

(58) Field of Classification Search
None
See application file for complete search history.

(56) References Cited

U.S. PATENT DOCUMENTS

| 2015/0130730 A1 | 5/2015 | Harley et al. |
| 2020/0150767 A1 | 5/2020 | Karimi Eskandary et al. |
| 2022/0365601 A1* | 11/2022 | Zhao ........................ G06F 3/038 |

FOREIGN PATENT DOCUMENTS

| CN | 112130665 A | 12/2020 |
| CN | 112987909 A | 6/2021 |
| EP | 2270627 A1 | 1/2011 |
| EP | 2472365 B1 | 10/2016 |
| EP | 2198422 B1 | 12/2017 |
| EP | 3293621 A2 | 3/2018 |
| WO | 2021227815 A1 | 11/2021 |

OTHER PUBLICATIONS

Kim, Kwangtaek, "Perception-Based Tactile Soft Keyboard for the Touchscreen of Tablets", In Journal of Mobile Information Systems, vol. 2018, Feb. 13, 2018, pp. 1-10.
"International Search Report and Written Opinion Issued in PCT Application No. PCT/US23/020098", dated Jul. 26, 2023, 15 Pages.

* cited by examiner

*Primary Examiner* — Stephen T. Reed
(74) *Attorney, Agent, or Firm* — Alleman Hall Creasman & Tuttle LLP

(57) ABSTRACT

Computing devices and methods for adjusting a driving signal for a haptic trackpad are disclosed. In one example, a computing device comprises a trackpad that comprises a printed circuit board. An accelerometer is affixed to the printed circuit board and a haptic actuator is coupled to the trackpad. A memory stores instructions executable by a processor to drive the haptic actuator to cause a first trackpad acceleration. The accelerometer measures the first trackpad acceleration, and an acceleration variance is determined by comparing the first trackpad acceleration to a target acceleration. The acceleration variance is used to adjust a driving signal for the haptic actuator to an adjusted driving signal. The haptic actuator is driven with the adjusted driving signal to cause a second trackpad acceleration different from the first trackpad acceleration.

20 Claims, 7 Drawing Sheets

(6A)

▼

Wherein the touch input is a first touch input, on condition of receiving a second touch input at the selected subregion in the array of subregions of the touch surface, driving the haptic actuator with the adjusted driving signal 236

▼

Determining a touch force of a touch input received by the trackpad 240

At least on condition that the touch force does not exceed the threshold touch force, refrain from driving the haptic actuator 242

▼

Using the touch force to adjust the driving signal for the haptic actuator to an adjusted driving signal 244

Mapping the touch force to a touch force scaling factor using a machine learning algorithm 248

Train the machine learning algorithm with at least the touch force and the trackpad acceleration, and with additional touch forces of additional touch inputs and their corresponding resulting accelerations to converge actual trackpad accelerations toward the target acceleration 252

▼

Determining a touch force variance by comparing the touch force to a target touch force 254

▼

Determining that the touch force variance is outside a touch force tolerance range of the target touch force 256

▼

At least on condition that the touch force variance is outside the touch force tolerance range, using the touch force variance to adjust the driving signal for the haptic actuator to the adjusted driving signal 260

FIG. 6B

COMPUTING DEVICE WITH HAPTIC TRACKPAD

BACKGROUND

Some computing devices include a trackpad for receiving user inputs. In some of these devices, the trackpad is coupled to haptic components that are configured to generate vibrations in the trackpad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to methods and computing devices for adjusting a driving signal for a haptic trackpad in a computing device. In some examples, a haptic actuator in the computing device is driven with a driving signal to cause a trackpad acceleration in the trackpad. The trackpad acceleration is measured with an accelerometer in the computing device. An acceleration variance is determined by comparing the trackpad acceleration to a target acceleration. The driving signal for the haptic actuator is then adjusted to an adjusted driving signal using the acceleration variance.

As described in more detail below, and in one potential advantage of the present disclosure, this closed-loop process of measuring actual trackpad accelerations and adjusting the driving signal accordingly can be repeatedly performed during end-user operation of the computing device, thereby providing on-going calibration of the trackpad acceleration over the useful life of the computing device to account for changes in the mechanical properties of the trackpad and/or other components and structures of the computing device.

In some examples, a computing device comprises a trackpad comprising a printed circuit board. An accelerometer is affixed to the printed circuit board and a haptic actuator is coupled to the trackpad. A memory stores instructions executable by a processor to drive the haptic actuator to cause a first trackpad acceleration in the trackpad. The accelerometer is used to measure the first trackpad acceleration, and an acceleration variance is determined by comparing the first trackpad acceleration to a target acceleration. The acceleration variance is used to adjust a driving signal for the haptic actuator to an adjusted driving signal. The haptic actuator is driven with the adjusted driving signal to cause a second trackpad acceleration in the trackpad different from the first trackpad acceleration.

BRIEF DESCRIPTION OF THE DRAWINGS

FIGS. 6A and 6B show a flow diagram of an example method for adjusting a driving signal for a haptic trackpad in a computing device according to examples of the present disclosure.

DETAILED DESCRIPTION

Figure 1:
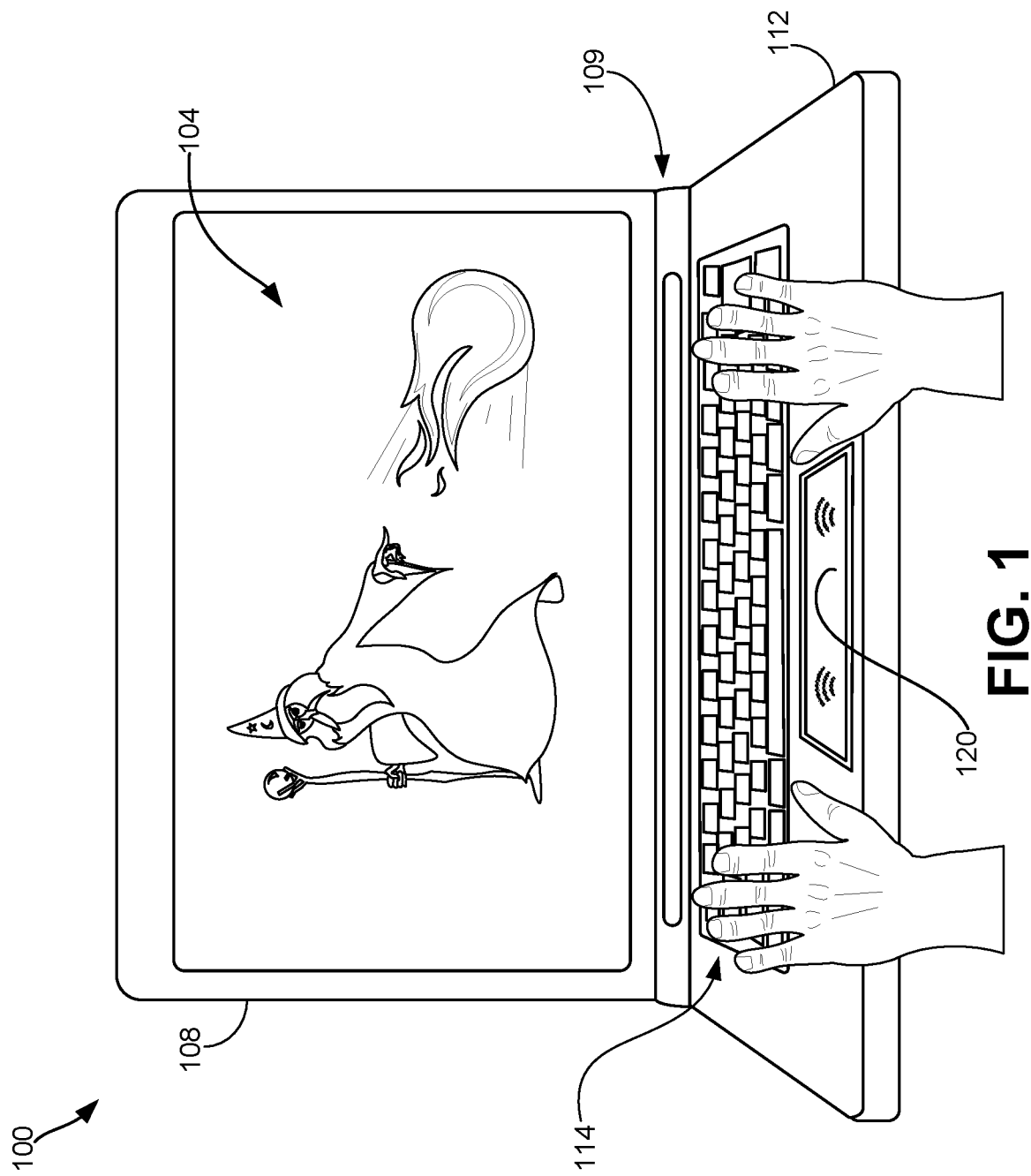
FIG. 1 shows one example of a computing device with a haptic trackpad according to examples of the present disclosure.

Some computing devices include a trackpad for receiving user inputs. In some of these devices, the trackpad is coupled to one or more haptic components that are configured to generate vibrations in the trackpad. For example, in some devices one or more conductive coils, linear resonant actuators (LRAs), or other haptic components are coupled to the trackpad and configured to vibrate the trackpad to provide haptic feedback to a user.

Over time, the mechanical properties of the trackpad and/or computing device components can change and alter the performance of the haptic trackpad and the corresponding vibrations sensed and/or heard by the user. For example, mechanical changes over the life of a computing device can change the haptic feedback experienced by the user. Such changes can include, but are not limited to, deformations and material property changes (such as stiffness) in one or more trackpad components, haptic actuators, and other computing device components. In some examples, fasteners and/or other retention features of the haptic actuator components can loosen with use over time. In some examples, changing environmental conditions, such as temperature and relative humidity, also can cause changes in mechanical properties of the computing device. Additionally, and in some examples, in the manufacturing process variations in assembly and/or components of the computing devices can result in different mechanical and structural properties among different devices.

In any of the preceding examples, changes in the device's mechanical properties can result in changes to the mechanical resonance properties of the trackpad. Such resonance changes can alter the haptic feedback experienced in different locations of the trackpad, thereby creating a varying and inconsistent haptic experience for the user. Further, dropping the device or otherwise subjecting the device to sudden forces or exterior contacts can loosen fasteners and/or cause other unintended structural changes in the device that change the trackpad's haptic output.

In some examples, a haptic trackpad module can provide different haptic feedback in devices having different form factors. For example, a trackpad module utilized in a thin and light laptop chassis will provide different haptic output as compared to the same trackpad module used in a heavy notebook workstation device that has greater mass and correspondingly smaller vibration dampening properties. Accordingly, to provide an acceptable haptic performance, extensive design resources and factory calibration processes may be required for the different computing devices in which the trackpad module is utilized. Further and as noted above, use of the product over time can change the haptic properties and performance of the trackpad.

Accordingly, and as described in more detail below, configurations of the present disclosure provide computing devices and methods for adjusting a driving signal for a haptic trackpad in a computing device. By utilizing one or more integrated accelerometers and a closed-loop feedback process as described below, computing devices of the present disclosure can provide on-going calibration of the haptic output produced by a haptic actuator over the lifetime of the product. Advantageously, by continually adjusting the driving signal in this manner, the computing device can produce consistent haptic output, even as mechanical properties of the device change over time.

With reference now to FIGS. 1-5 and 7, an example computing device 100 in the form of a laptop computer is illustrated. In other examples, aspects of the present disclosure can be implemented in tablet computing devices, foldable computing devices, wearable and other mobile computing devices, and any other type of computing device that utilizes a haptic trackpad.

Computing device 100 includes a display 104 on a display substrate 108 that is rotatably coupled at a hinge 109 to a chassis 112. The chassis 112 includes a trackpad 120 and a keyboard 114 mounted therein. In different examples a user provides touch inputs to the trackpad 120 by touching the trackpad with one or more digits of the user's hand. As described in more detail below, the trackpad 120 includes a haptic actuator 124 and an accelerometer 126 (see FIG. 2) that measures actual trackpad accelerations created by the haptic actuator. In one potential advantage of the present disclosure, by comparing trackpad accelerations to a target acceleration, the computing device can continually adjust a driving signal for the haptic actuator to an adjusted driving signal that more closely approximates a target acceleration.

Trackpad 120 is configured to detect the position and movement of a user's finger(s) and/or thumb and translate such position/movement to a relative position on the display 104. In this example, the trackpad 120 also includes a force sensor 122, such as a strain gauge or piezoelectric device, that is configured to determine a touch force exerted by a user's finger(s) and/or thumb on the trackpad. In other examples where touch detection algorithms of the computing device 100 are also configured to measure force, such algorithms can determine the touch force exerted by a user's finger(s) and/or thumb on the trackpad 120 and discrete force sensing components are not required.

In some examples, the trackpad 120 is a mutual capacitance trackpad. In these examples, touch inputs are identified by sampling capacitance between a driving electrode and a sensing electrode. Driving electrodes are arranged in an array within the trackpad 120. Touch detection signals are provided to each of the electrodes at a different frequency and/or at a different time. Grounded conductive materials, such as a user's finger, draw electric field lines away from sensing electrodes when providing a touch input. This results in a lower capacitive coupling between driving and sensing electrodes. Such lower capacitive coupling is measured by a touch sensing processor as a lower current flow from the driving electrode to sensing electrode. A location of the touch input can be reconstructed based at least in part on determining which driving electrodes were being driven when the touch input occurred, and the frequency of the touch detection signal driving each driving electrode. In other examples, the principles of the present disclosure may be utilized with trackpads employing other touch detection technologies, including but not limited to self-capacitance and projected capacitance touch detection.

Figure 2:
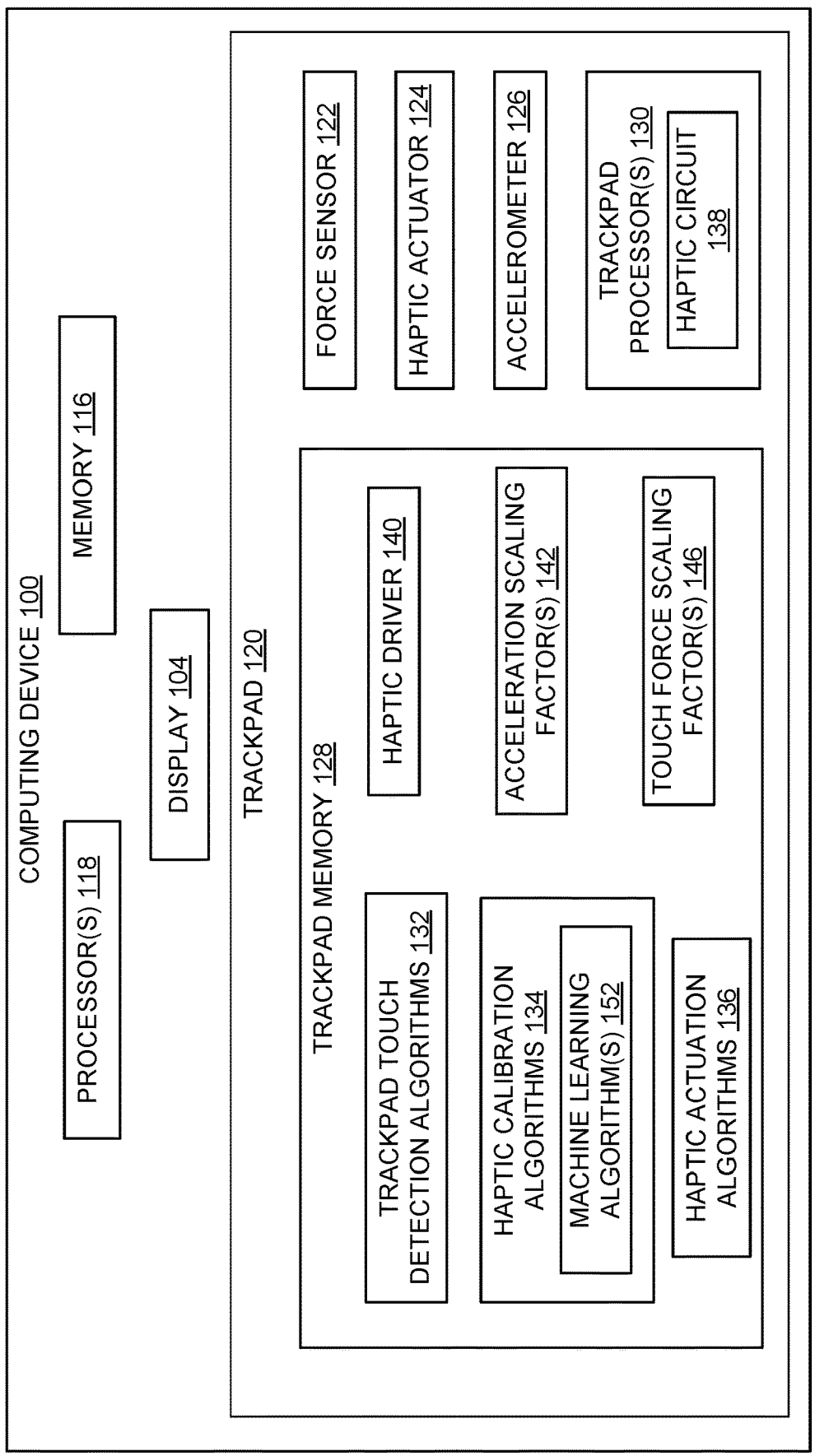
FIG. 2 shows a schematic view of components of the computing device of FIG. 1 according to examples of the present disclosure.

With reference now to FIG. 2, a schematic view of components of one example of the computing device of FIG. 1 is provided. Computing device 100 includes memory 116 that stores instructions executable by a processor 118. Such instructions can include an operating system and one or more applications. In the present example, the trackpad 120 comprises a trackpad memory 128 that stores instructions executable by a trackpad processor 130. For example, the trackpad memory 128 stores instructions in the form of trackpad touch detection algorithms 132 executable by the trackpad processor 130 to perform touch detection on the trackpad 120 using signals received from the trackpad. Additionally, and as described in more detail below, trackpad memory 128 stores instructions in the form of haptic calibration algorithms 134 executable by the trackpad processor 130 to receive and process signals from the accelerometer 126, determine trackpad accelerations, and use the accelerations to adjust driving signals for the haptic actuator 124. Haptic actuation algorithms 136 are executed by the trackpad processor 130 to drive the haptic actuator with the adjusted driving signals. For example, in some examples the trackpad processor 130 includes a haptic circuit 138 configured to execute a haptic driver 140 that controls activation of the haptic actuator 124.

In other examples, the haptic circuit 138 is located on processor 118. In some examples, one or more of the trackpad touch detection algorithms 132, haptic calibration algorithms 134, haptic actuation algorithms 136, haptic driver 140, acceleration scaling factor(s) 142 and touch force scaling factor(s) 146 (described further below) are stored in memory 116 and executed by processor(s) 118 of computing device 100. In some examples, the trackpad 120 includes the haptic actuator 124 and accelerometer 126 and does not include a dedicated memory or processor. Additional details regarding processor(s) 118, trackpad processor(s) 130, memory 116, trackpad memory 128, and other components and subsystems of computing device 100 and trackpad 120 are described further below with reference to FIG. 7.

Figure 3:
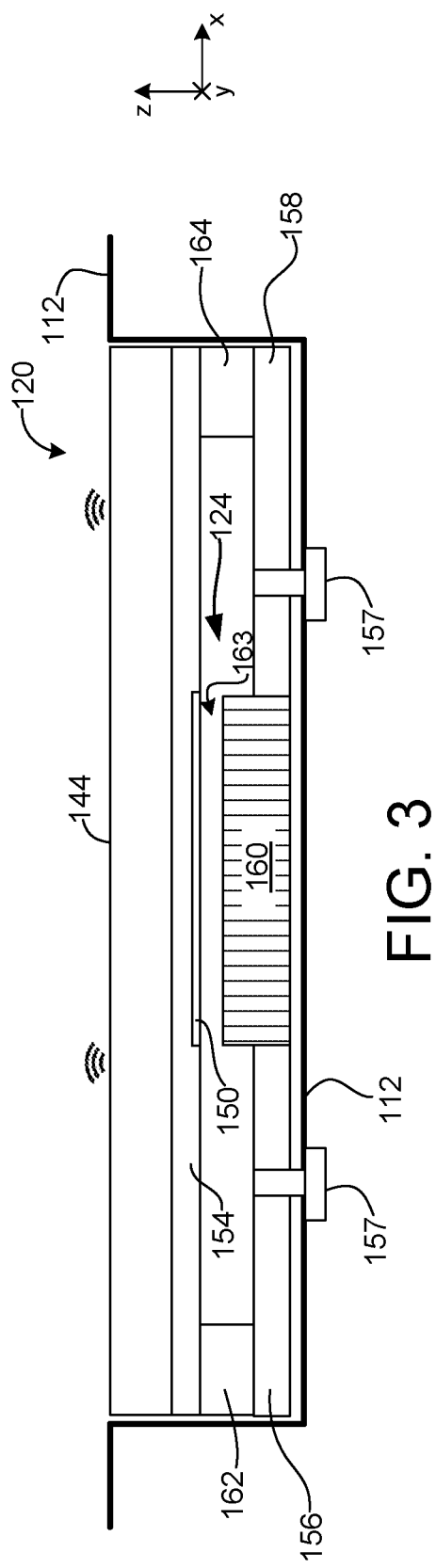
FIG. 3 shows a schematic view of components of the trackpad and haptic actuator of the computing device of FIG. 1 according to examples of the present disclosure.
Figure 4:
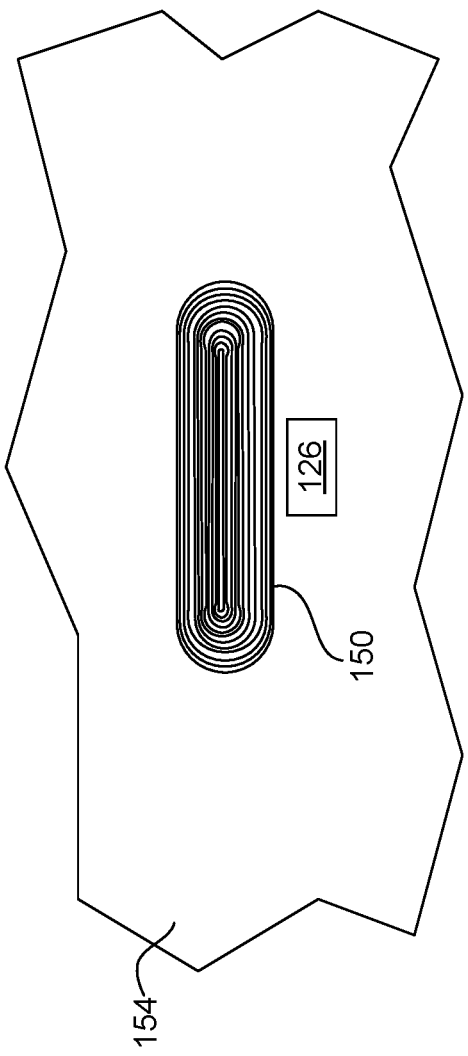
FIG. 4 shows a partial schematic view of a conductive coil located in a printed circuit board of the haptic actuator of FIG. 3 according to examples of the present disclosure.

In some configurations of the present disclosure, the haptic actuator 124 comprises one or more conductive coils formed on or affixed to a printed circuit board of the trackpad, and one or more magnets mounted adjacent to the conductive coil(s). With reference now to FIGS. 3 and 4, in one example the trackpad 120 includes a touch surface 144, such as a glass layer. Beneath the touch surface 144 is a printed circuit board 154 comprising driving and sensing electrodes as described above.

In this example, the printed circuit board 154 is affixed to a first mounting plate 156 and second mounting plate 158 via a first spacer 162 and second spacer 164, respectively. In some examples, the first spacer 162 and second spacer 164 comprise a resilient, dampening material to mechanically isolate the trackpad 120 and dissipate the transmission of forces and other mechanical energy between the trackpad 120 and the chassis 112. For example, the first spacer 162 and second spacer 164 may comprise an elastomeric material, such as rubber or any other suitable material. The first mounting plate 156 and second mounting plate 158 are coupled to the chassis 112 by fasteners 157, such as screws.

With reference also to FIG. 4, the haptic actuator 124 comprises a conductive coil 150 that is formed on the printed circuit board 154. In other examples, the conductive coil 150 may be a discrete coil module that is affixed to the surface of the printed circuit board 154. In other examples, two or more conductive coils may be utilized. In the present example, the accelerometer 126 is affixed to the printed circuit board 154 adjacent to the conductive coil 150. In other examples, the accelerometer 126 may be located at any other suitable location on the printed circuit board 154.

The conductive coil 150 and is formed of a conductive material. Examples of conductive materials include various metals, such as aluminum, gold, silver, and copper. The conductive coil 150 in this example is planar in structure. More particularly, the conductive coil 150 is relatively thin as compared to its length and width to provide a relatively flat structure. In the present example, the conductive coil 150 is formed by a conductive line tracing a planar spiral pattern with a progressively larger distance from the center portion of the coil to its outer edge.

The conductive coil(s) can be formed on the printed circuit board 154 in any suitable method, such as a masking technique, via deposition and etching of a conductive film on the printed circuit board, or via 3-dimensional printing techniques. In other examples, a pre-formed conductive coil can be affixed to the printed circuit board 154 by any suitable method, including gluing.

As shown in FIG. 3, in this example the haptic actuator 124 includes a magnet 160 that is affixed to the first mounting plate 156 and second mounting plate 158. In this example, the magnet 160 is spaced from the conductive coil 150 to form a gap 163 between the magnet and the coil and printed circuit board 154. In this configuration, the haptic circuit 138 executes the haptic driver 140 to generate and deliver a driving signal to the conductive coil 150. The driving signal is controlled to generate electromagnetic fields that exert magnetic forces on the magnet 160 and corresponding forces on the conductive coil 150 and attached printed circuit board 154 and touch surface 144 of the trackpad 120. More particularly, in this example Lorentz forces operate to vibrate the touch surface 144 laterally in the x-y plane and thereby provide haptic feedback to one or more digits of a user contacting the touch surface.

As noted above, the mechanical properties of a trackpad and/or computing device components can change over time, thereby altering the performance of the haptic trackpad and the resulting vibrations sensed by the user. For example, fasteners and other structural components, such as first and second mounting plates 156, 158 and fasteners 157, may loosen, deform, or otherwise change over time with repeated use of the computing device. These changes can result in undesirable changes in the mechanical resonance properties of the trackpad. Such resonance changes can correspondingly alter the haptic feedback experienced in different locations of the trackpad, thereby creating a varying and inconsistent haptic experience for the user.

Accordingly, and as described further below, configurations of the present disclosure utilize the integrated accelerometer 126 and a closed-loop feedback process to adjust driving signals for the haptic trackpad 120 and provide on-going calibration of the haptic output produced by the haptic actuator 124 over the useful life of the computing device 100. Advantageously, by continually adjusting the driving signal in this manner, the computing device can produce consistent haptic output to the end user, even as mechanical properties of the device change over time.

Figure 5:
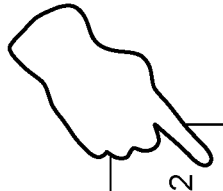
FIG. 5 shows an array of subregions of the trackpad with acceleration scaling factors according to examples of the present disclosure.
Figure 6A:
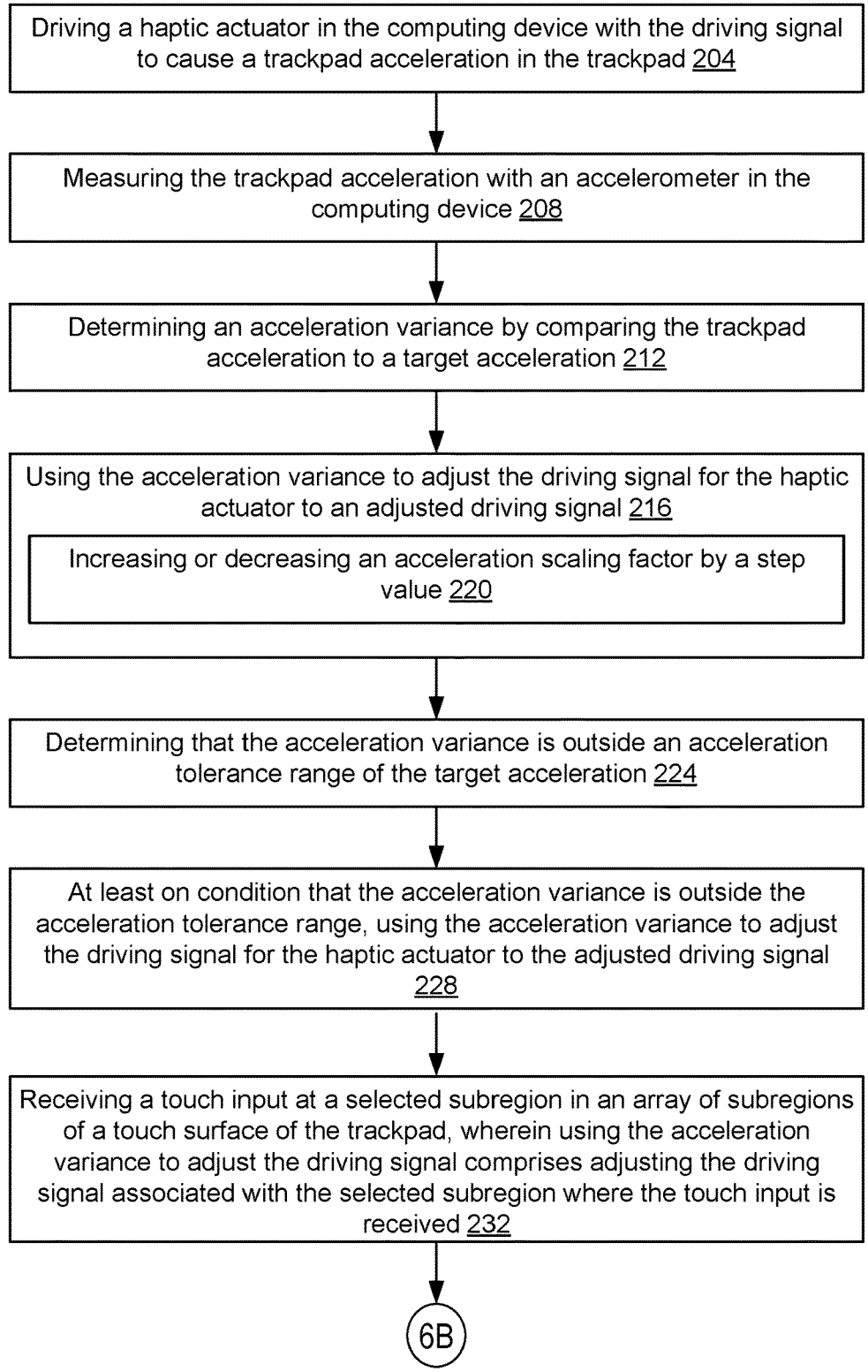

With reference now to FIGS. 6A and 6B, an example method 200 for adjusting a driving signal for the haptic trackpad 120 in computing device 100 will now be described. FIGS. 6A and 6B depict a flowchart illustrating the method 200. The following description of method 200 is provided with reference to the software and hardware components described herein and shown in FIGS. 1-5 and 7. For example, the method 200 may be performed by the computing device 100, hardware, software, and/or firmware of the computing device 100.

It will be appreciated that the following description of method 200 is provided by way of example and is not meant to be limiting. Therefore, it is to be understood that method 200 may include additional and/or alternative steps relative to those illustrated in FIGS. 6A and 6B. Further, it is to be understood that the steps of method 200 may be performed in any suitable order. Further still, it is to be understood that one or more steps may be omitted from method 200 without departing from the scope of this disclosure. It will also be appreciated that method 200 also may be performed in a variety of other computing devices having different form factors, components, and/or capabilities, and in other contexts using other suitable components.

As described further below, the method 200 is performed in response to receiving a touch input on the trackpad 120. The trackpad touch detection algorithms 132 are configured to determine the location of the touch input. In some examples, a touch force of a touch input received by the trackpad is also determined by the touch detection algorithms 132 or by a separate force sensor as described above. In these examples, the trackpad touch detection algorithms 132 can compare the detected touch force to a threshold touch force that represents a minimum force magnitude determined to indicate a valid touch input from a user (as opposed to an inadvertent touch or other contact not intended to be a user touch input). On condition that the touch force does not exceed a threshold touch force, which indicates an invalid touch input, the trackpad touch detection algorithms 132 can refrain from driving the haptic actuator. On condition that the touch force meets or exceeds the threshold touch force, the trackpad touch detection algorithms 132 can proceed with providing a driving signal to the haptic actuator 124 to cause a trackpad acceleration in the trackpad 120.

With reference to FIG. 6A, at 204 the method 200 includes driving the haptic actuator 124 in the computing device 100 with a driving signal to cause a first trackpad acceleration in the trackpad 120. In some examples, the driving signal comprises a current multiplied by a scaling factor, such as an acceleration scaling factor 142. In some examples, an initial scaling factor is allocated and stored in memory 128. As described in more detail below, and in one potential advantage of the present disclosure, using actual trackpad acceleration measurements from the accelerometer 126, the initial scaling factor (and subsequently-adjusted scaling factors) is increased or decreased via a closed-loop, adaptive learning process to adjust the driving signal in a manner that produces adjusted trackpad accelerations that more closely approximate a target acceleration.

Returning to FIG. 6A, at 208 the method 200 includes measuring the first trackpad acceleration using a signal from the accelerometer 126 in the computing device 100. At 212 the method 200 includes determining an acceleration variance by comparing the first trackpad acceleration to a target acceleration. As described further in use case examples below, at 216 the method 200 includes using the acceleration variance to adjust the driving signal for the haptic actuator to an adjusted driving signal. The haptic actuator 124 is then driven with the adjusted driving signal to cause a second trackpad acceleration in the trackpad that is different from the first trackpad acceleration.

Advantageously and as described in more detail below, by performing these steps continuously in a closed-loop process during actual use of the computing device by an end user, the haptic calibration algorithms 134 continually adjust the driving signal to generate trackpad accelerations more closely approximating the target acceleration, thereby enabling the computing device to produce consistent haptic output even as mechanical properties of the device change over time.

In some examples and at 220, the method 200 includes using the acceleration variance to adjust the driving signal by increasing or decreasing an acceleration scaling factor by an acceleration step value. For example and as noted above, the haptic actuation algorithms 136 can generate driving signals by multiplying a predetermined current value I by an acceleration scaling factor 142. In one example, an initial acceleration scaling factor 142 is 2.0, the target acceleration is 5.0 G, and the acceleration step value is 0.1. In this example, a first driving signal of 2.0*I is generated and causes a measured first trackpad acceleration of 3.0 G.

Because the measured first trackpad acceleration of 3.0 G is less than the target acceleration of 5.0 G force, the initial acceleration scaling factor of 2.0 is increased by the acceleration step value of 0.1 to a value of 2.1. Accordingly, and in this example, the next driving signal generated by the haptic actuation algorithms 136 will have a higher current value of 2.1*I, thereby resulting in a second trackpad acceleration greater than the first trackpad acceleration and closer to the target acceleration of 5.0 G. It will be appreciated that in other examples, a range of other magnitudes of target accelerations, different acceleration scaling factors, and/or different acceleration step values can be utilized according to different trackpad and computing device design considerations and different haptic feedback requirements.

In some examples, the haptic calibration algorithms 134 are configured to determine if the measured first trackpad acceleration is within a target tolerance range of the target acceleration. In one example and with reference again to FIG. 6A, at 224 the method 200 includes determining that the acceleration variance is outside an acceleration tolerance range of the target acceleration. At 228 the method 200 includes, at least on condition that the acceleration variance is outside the acceleration tolerance range, using the acceleration variance to adjust the driving signal for the haptic actuator to the adjusted driving signal.

In one example, the target acceleration is 5.0 G, the acceleration tolerance range is +/−0.5 G, and the measured first trackpad acceleration is 3.0 G. Because the measured first trackpad acceleration of 3.0 G is not within 0.5 G of the target acceleration of 5.0 G, the haptic calibration algorithms 134 proceed to adjust the driving signal for the haptic actuator to an adjusted driving signal as described above. In another example, the target acceleration is 5.0 G, the acceleration tolerance range is +/−0.5 G, and a subsequently measured trackpad acceleration is 4.7 G. Here, because the subsequently measured trackpad acceleration of 4.7 G is within the acceleration tolerance range of 0.5 G of the target acceleration of 5.0 G, the haptic calibration algorithms 134 refrain from modifying the acceleration scaling factor or otherwise adjusting the driving signal for the haptic actuator.

In some examples and with reference now to FIG. 5, different driving signals are utilized based upon the location of the user's touch input on the touch surface 144 of the trackpad 120. In this manner and in these examples, the driving signal is adjusted based on the location of the touch input to compensate for different changes in the mechanical resonance characteristics of the trackpad 120 that result from touch inputs at different locations. In the example of FIG. 5, the touch surface 144 of touchpad 120 is divided into an array of subregions spanning 7 columns numbered 1-7 and 5 rows lettered A-F. In other examples, different numbers of columns and/or rows of subregions may be utilized. In one example and with reference to FIG. 5, a user touching subregion F1 in the Southeast corner of the touch surface 144 causes a certain resonance profile in the trackpad 120 that creates a relatively minor dampening of vibrations in the trackpad. Accordingly, the driving signal is minimally adjusted to reflect the minor dampening of the resulting resonance profile of the trackpad 120. However, when the user touches subregion C4 in the middle of the touch surface 144, this causes a different resonance profile in the trackpad 120 that creates significant dampening of vibrations in the trackpad. Accordingly, for touch inputs in this subregion, the driving signal is significantly amplified to compensate for the increased dampening of the resulting resonance profile of the trackpad 120.

Accordingly, in this example and as described in more detail below, each of the subregions is allocated an initial acceleration scaling factor 142, designated "AS" in FIG. 5. Different subregions may have the same or different initial acceleration scaling factor 142. In some examples, the acceleration scaling factors 142 in each subregion may be selected to compensate for different resonance profile changes produced by touch inputs in each subregion. In the example of FIG. 5, each acceleration scaling factor AS also includes a numerical value, such as "AS3", with higher numbers indicating a larger scaling factor.

With reference again to FIG. 6A, at 232 the method 200 includes receiving a first touch input at a selected subregion in the array of subregions of the touch surface 144 of the trackpad 120, and adjusting the driving signal associated with the selected subregion where the touch input is received. For example and as shown in FIG. 5, a touch input is received at subregion A7 which corresponds to an acceleration scaling factor 142 of AS2. In one example, the acceleration scaling factor AS2 allocated to subregion A7 is 2.0, the target acceleration is 5.0 G, and the acceleration step value is 0.1. In this example, a first driving signal of 2.0*I is generated and causes a measured first trackpad acceleration of 3.0 G.

Because the measured first trackpad acceleration of 3.0 g force is less than the target acceleration of 5.0 g force, the acceleration scaling factor AS2 of 2.0 is increased by the acceleration step value 0.1 to a value of 2.1. Accordingly and with reference now to FIG. 6B, at 236 the method 200 includes, wherein the touch input is a first touch input, on condition of receiving a second touch input at the selected subregion in the array of subregions of the touch surface, driving the haptic actuator with the adjusted driving signal. In the present example, on condition of receiving a second touch input at the selected subregion A7 in the array of subregions, driving the haptic actuator 124 with the adjusted driving signal having a higher current value of 2.1*I, thereby resulting in a second trackpad acceleration greater than the first trackpad acceleration at the selected subregion A7. Advantageously and in this manner, by continually adjusting the driving signals at each subregion in the array of subregions, these configurations provide a closed-loop process that continually calibrates and customizes the driving signals based at least upon the location of the touch input on the touch surface 144 and the measured actual trackpad accelerations generated by the haptic actuator 124.

As noted above, in some examples the trackpad 120 is configured to determine a touch force exerted by a user on the trackpad 120. With reference again to FIG. 6B, in some examples at 240 the method 200 includes determining a touch force of a touch input received by the trackpad. In some examples and as described further below, the haptic calibration algorithms 134 are configured to adjust the driving signal for the haptic actuator using the touch force in addition to the acceleration variance as described above. Advantageously, in these examples the driving signals are continually adjusted and calibrated using both the measured actual trackpad accelerations generated by the haptic actuator 124 and the measured touch forces of the user's touch inputs.

At 242 and in some examples the method 200 includes, at least on condition that the measured touch force does not exceed a threshold touch force, which indicates an invalid touch input, refraining from driving the haptic actuator. Advantageously, in these examples the touch detection algorithms 132 reduce or substantially eliminate instances of providing haptic output in response to inadvertent touches or other contacts not intended to be a user touch input. As described further in use case examples below, at 244 the method 200 includes adjusting the driving signal for the haptic actuator 124 by using at least the touch force to adjust the driving signal. Accordingly, and in these examples, both the acceleration variance and the touch force are used to adjust the driving signal. In some examples and as described above, the location of the touch input also may be used to adjust the driving signal. The haptic actuator 124 is then driven with the adjusted driving signal to cause an adjusted trackpad acceleration in the trackpad.

Advantageously in these examples and as described in more detail below, by performing these steps continuously in a closed-loop process, the haptic calibration algorithms 134 continually adjust the driving signal using both acceleration variances determined via the accelerometer 126 and touch forces determined via the trackpad 120 to generate trackpad accelerations more closely approximating the target acceleration, thereby enabling the computing device to produce consistent haptic output even as mechanical properties of the device change over time. In this manner, and as described further below, some configurations of the present disclosure utilize measured touch forces of touch inputs provided by users over time along with their corresponding resulting accelerations to continually update one or more learning algorithms, which correspondingly adjust the haptic actuator driving signals to converge actual trackpad accelerations toward a target acceleration. Advantageously, these configurations provide ongoing acceleration compensations that adjust for changes in resonance properties of the entire mechanical assembly of the trackpad 120, chassis 112 and other components of computing device 100.

In some examples and at 248, the method 200 includes using the touch force to adjust the driving signal by mapping the touch force to a touch force scaling factor 146 using one or more machine learning algorithms 152. In these examples, the haptic actuation algorithms 136 can generate driving signals by multiplying a predetermined current value I by an acceleration scaling factor 142 as described above and by a touch force scaling factor 146.

In some examples, an initial haptic calibration algorithm 134 may be utilized when the computing device is first operated by a user. In some examples, the initial haptic calibration algorithm is a linear equation that maps a touch force to a touch force scaling factor 146. In one example, the initial haptic calibration algorithm is a linear equation in the form of $A=-2xF+14+2x(F-3)$, where A=the predetermined target acceleration, F=the measured force of a touch input, and x is the touch force scaling factor 146.

In this example, a user provides a touch input having a force F, and the touch force scaling factor 146 is determined based on the known target acceleration A. For example, where A=8 G, a touch input having a scaled force of 3 yields a touch force scaling factor of 1.0. In this example, a touch force of 3 results in no acceleration compensation based on touch force. Where A=8 G, a touch input having a scaled force of 4 yields a touch force scaling factor of 1.3. Accordingly, because the greater touch force creates more dampening effects that tend to reduce resulting trackpad accelerations, in this case the touch force scaling factor of 1.3 increases the driving current to compensate for such dampening effects. Similarly, where A=8 G and a touch input has a greater scaled force of 5, the equation yields a greater touch force scaling factor of 1.7. In each case, the haptic actuation algorithms 136 generate driving signals by multiplying a predetermined current value I by the touch force scaling factor and an acceleration scaling factor 142.

In some examples, instead of or in addition to using an initial haptic calibration algorithm as described above, configurations of the present disclosure include one or more machine learning algorithms 152 that map actual touch forces of touch inputs to a touch force scaling factor 146 using one or more models that are trained with actual touch forces of multiple touch inputs received over time and their corresponding resulting accelerations as measured by the accelerometer 126. Accordingly, in some examples and with reference again to FIG. 6B, at 252 the method 200 includes training the machine learning algorithm over time with a measured touch force and its corresponding trackpad acceleration, and with additional touch forces of additional touch inputs and their corresponding resulting accelerations to converge actual trackpad accelerations toward the target acceleration. In this manner, and in another potential advantage of the present disclosure, the machine learning algorithm(s) 152 utilize acceleration data collected from the accelerometer 126 along with corresponding force data collected from the trackpad 120 to continually adjust and refine touch force scaling factors in a manner that converges actual trackpad accelerations toward the target acceleration. In different examples, a variety of machine learning algorithms can be utilized, such as one or more neural networks, according to different trackpad and computing device design considerations and different haptic feedback requirements.

In some examples, and similar to the use of subregions as discussed above, different touch force scaling factors are used based upon the location of the user's touch input on the touch surface 144 of the trackpad 120. For example, where a touch input is received at a selected subregion in an array of subregions of a touch surface of the trackpad, the touch force of this touch input is used to adjust the driving signal associated with the selected subregion where the touch input is received. In these examples, the machine learning algorithm(s) 152 utilize acceleration data along with corresponding force data collected from touch inputs in the different subregions to continually adjust and refine corresponding touch force scaling factors that are associated with each of the subregions. In this manner and in these examples, the driving signal is adjusted based also on the location of the touch input to compensate for different changes in the mechanical resonance characteristics of the trackpad 120 that result from touch inputs at different locations.

In some examples and at 254 the method 200 includes determining a touch force variance by comparing the touch force to a target touch force. In some examples and with reference again to FIG. 6B, at 256 the method 200 includes determining that the touch force variance is outside a touch force tolerance range of the target touch force. And at 260 the method 200 includes, at least on condition that the touch force variance is outside the touch force tolerance range, using the touch force variance to adjust the driving signal for the haptic actuator to the adjusted driving signal.

In one example, the target touch force is 150 grams, the touch force tolerance range is +/−10 grams, and the measured touch force is 170 grams. Because the measured touch force of 170 grams is not within 10 grams of the target touch force of 150 grams, the haptic calibration algorithms 134 proceed to adjust the driving signal for the haptic actuator to an adjusted driving signal by subtracting the touch force step value from the current touch force scaling factor. In another example, the target touch force is 150 grams, the touch force tolerance range is +/−10 grams, and a subsequently measured touch force is 155 grams. Here, because the subsequently measured touch force of 155 grams is within the touch force tolerance range 10 grams of the target touch force of 150 grams, the haptic calibration algorithms 134 refrain from modifying the touch force scaling factor or otherwise adjusting the driving signal for the haptic actuator.

As described above, the computing devices and methods of the present disclosure advantageously provide a closed-loop, adaptive learning system that generates trackpad accelerations more closely approximating a target acceleration, thereby enabling the computing device to produce consistent haptic output even as mechanical properties of the device change over time. Additionally, and in other potential advantage of the present disclosure, the computing devices and methods of the present disclosure can reduce requirements for factory calibration procedures for haptic trackpads and associated computing devices. Further and in some examples, the computing devices and methods of the present disclosure can enable more relaxed component tolerances and reduced design resources for different computing devices in which haptic trackpad modules are utilized.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
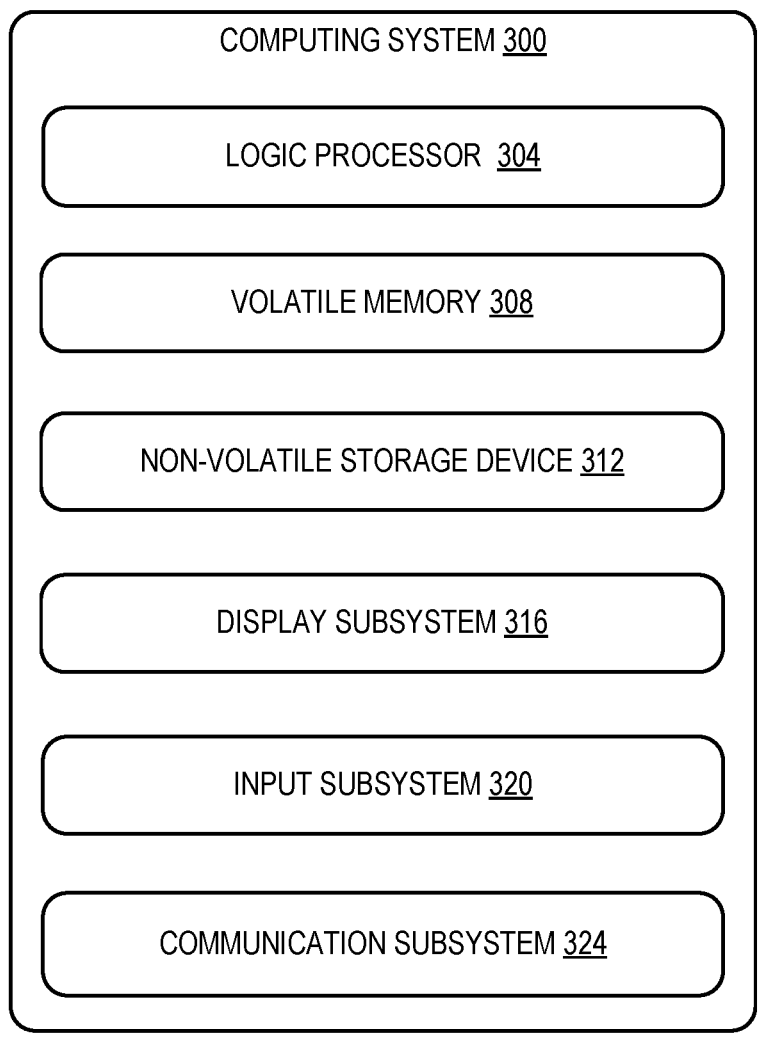
FIG. 7 shows a block diagram of an example computing system according to examples of the present disclosure.

FIG. 7 schematically shows a simplified representation of a computing system 300 configured to provide any to all of the compute functionality described herein. Computing system 300 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. The computing device 100 described above may comprise computing system 300 or one or more aspects of computing system 300.

Computing system 300 includes a logic processor 304, volatile memory 308, and a non-volatile storage device 312. Computing system 300 may optionally include a display subsystem 316, input subsystem 320, communication subsystem 324, and/or other components not shown in FIG. 7.

Logic processor 304 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 304 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 304 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 312 includes one or more physical devices configured to hold instructions executable by the logic processors to implement the methods and processes described herein. When such methods and processes are implemented, the state of non-volatile storage device 312 may be transformed—e.g., to hold different data.

Non-volatile storage device 312 may include physical devices that are removable and/or built-in. Non-volatile storage device 312 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 312 may include nonvolatile, dynamic, static, read/write, read-only, sequential-access, location-addressable, file-addressable, and/or content-addressable devices. It will be appreciated that non-volatile storage device 312 is configured to hold instructions even when power is cut to the non-volatile storage device 312.

Volatile memory 308 may include physical devices that include random access memory. Volatile memory 308 is typically utilized by logic processor 304 to temporarily store information during processing of software instructions. It will be appreciated that volatile memory 308 typically does not continue to store instructions when power is cut to the volatile memory 308.

Aspects of logic processor 304, volatile memory 308, and non-volatile storage device 312 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), microcontroller units (MCUs), and complex programmable logic devices (CPLDs), for example.

When included, display subsystem 316 may be used to present a visual representation of data held by non-volatile storage device 312. As the herein described methods and processes change the data held by the non-volatile storage device, and thus transform the state of the non-volatile storage device, the state of display subsystem 316 may likewise be transformed to visually represent changes in the underlying data. Display subsystem 316 may include one or more display devices utilizing virtually any type of technology. Such display devices may be combined with logic processor 304, volatile memory 308, and/or non-volatile storage device 312 in a shared enclosure, or such display devices may be peripheral display devices.

When included, input subsystem 320 may comprise or interface with one or more user-input devices such as a stylus, touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 324 may be configured to communicatively couple various computing devices described herein with each other, and with other devices. Communication subsystem 324 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the subject application. One aspect provides a computing comprising: a trackpad comprising a printed circuit board; an accelerometer affixed to the printed circuit board; a haptic actuator coupled to the trackpad; a processor; and a memory storing instructions executable by the processor to: drive the haptic actuator with a driving signal to cause a first trackpad acceleration in the trackpad; measure the first trackpad acceleration using a signal from the accelerometer; determine an acceleration variance by comparing the first trackpad acceleration to a target acceleration; use the acceleration variance to adjust the driving signal for the haptic actuator to an adjusted driving signal; and drive the haptic actuator with the adjusted driving signal to cause a second trackpad acceleration in the trackpad different from the first trackpad acceleration. The computing device may additionally or alternatively include, wherein the instructions are executable to: determine that the acceleration variance is outside an acceleration tolerance range of the target acceleration; and at least on condition that the acceleration variance is outside the acceleration tolerance range, use the acceleration variance to adjust the driving signal for the haptic actuator to the adjusted driving signal. The computing device may additionally or alternatively include, wherein using the acceleration variance to adjust the driving signal comprises increasing or decreasing an acceleration scaling factor by an acceleration step value. The computing device may additionally or alternatively include, wherein the instructions are executable to receive a touch input at a selected subregion in an array of subregions of a touch surface of the trackpad, and using the acceleration variance to adjust the driving signal comprises adjusting the driving signal associated with the selected subregion where the touch input is received. The computing device may additionally or alternatively include, wherein the touch input is a first touch input, and driving the haptic actuator with the adjusted driving signal is performed on condition of receiving a second touch input at the selected subregion in the array of subregions of the touch surface. The computing device may additionally or alternatively include, wherein the instructions are executable to: determine a touch force of a touch input received by the trackpad; and at least on condition that the touch force does not exceed a threshold touch force, refrain from driving the haptic actuator. The computing device may additionally or alternatively include, wherein the instructions are executable to: determine a touch force of a touch input received by the trackpad, wherein adjusting the driving signal for the haptic actuator further comprises using the touch force to adjust the driving signal. The computing device may additionally or alternatively include, wherein the instructions are executable to: determine a touch force variance by comparing the touch force to a target touch force; determine that the touch force variance is outside a touch force tolerance range of the target touch force; and at least on condition that the touch force variance is outside the touch force tolerance range, use the touch force to adjust the driving signal for the haptic actuator to the adjusted driving signal. The computing device may additionally or alternatively include, wherein using the touch force to adjust the driving signal comprises mapping the touch force to a touch force scaling factor using a machine learning algorithm. The computing device may additionally or alternatively include, wherein the instructions are executable to train the machine learning algorithm with at least the touch force and the second trackpad acceleration, and with additional touch forces of additional touch inputs and their corresponding resulting accelerations to converge actual trackpad accelerations toward the target acceleration. The computing device may additionally or alternatively include, wherein the instructions are executable to receive the touch input at a selected subregion in an array of subregions of a touch surface of the trackpad, and wherein using the touch force to adjust the driving signal comprises adjusting the driving signal associated with the selected subregion where the touch input is received.

Another aspect provides a method for adjusting a driving signal for a haptic trackpad in a computing device, the method comprising: driving a haptic actuator in the computing device with the driving signal to cause a trackpad acceleration in the trackpad; measuring the trackpad acceleration using a signal from an accelerometer in the computing device; determining an acceleration variance by comparing the trackpad acceleration to a target acceleration; and using the acceleration variance to adjust the driving signal for the haptic actuator to an adjusted driving signal. The method may additionally or alternatively include, determining that the acceleration variance is outside an acceleration tolerance range of the target acceleration; and at least on condition that the acceleration variance is outside the acceleration tolerance range, using the acceleration variance to adjust the driving signal for the haptic actuator to the adjusted driving signal. The method may additionally or alternatively include, wherein using the acceleration variance to adjust the driving signal comprises increasing or decreasing an acceleration scaling factor by an acceleration step value. The method may additionally or alternatively include, receiving a touch input at a selected subregion in an array of subregions of a touch surface of the trackpad, wherein using the acceleration variance to adjust the driving signal comprises adjusting the driving signal associated with the selected subregion where the touch input is received. The method may additionally or alternatively include, wherein the touch input is a first touch input, the method further comprising, on condition of receiving a second touch input at the selected subregion in the array of subregions of the touch surface, driving the haptic actuator with the adjusted driving signal. The method may additionally or alternatively include, determining a touch force of a touch input received by the trackpad, wherein adjusting the driving signal for the haptic actuator further comprises using the touch force to adjust the driving signal. The method may additionally or alternatively include, wherein using the touch force to adjust the driving signal comprises mapping the touch force to a touch force scaling factor using a machine learning algorithm. The method may additionally or alternatively include, training the machine learning algorithm with at least the touch force and the trackpad acceleration, and with additional touch forces of additional touch inputs and their corresponding resulting accelerations to converge actual trackpad accelerations toward the target acceleration.

Another aspect provides a computing device comprising: a trackpad comprising a printed circuit board; an accelerometer affixed to the printed circuit board; a haptic actuator coupled to the trackpad; a processor; and a memory storing instructions executable by the processor to: receive a first touch input at a selected subregion in an array of subregions of a touch surface of the trackpad; determine a touch force of the first touch input; at least on condition that the touch force exceeds a threshold touch force, use a driving signal associated with the selected subregion to drive the haptic actuator to cause a first trackpad acceleration in the trackpad; measure the first trackpad acceleration using a signal from the accelerometer; determine an acceleration variance by comparing the first trackpad acceleration to a target acceleration; use the acceleration variance to adjust the driving signal associated with the selected subregion to an adjusted driving signal; receive a second touch input at the selected subregion in the array of subregions of the touch surface; and at least on condition of receiving the second touch input at the selected subregion, drive the haptic actuator with the adjusted driving signal to cause a second trackpad acceleration in the trackpad different from the first trackpad acceleration.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a trackpad comprising a printed circuit board;
   an accelerometer affixed to the printed circuit board;
   a haptic actuator coupled to the trackpad;
   a processor; and
   a memory storing instructions executable by the processor to:
   drive the haptic actuator with a driving signal to cause a first trackpad acceleration in the trackpad;
   measure the first trackpad acceleration using a signal from the accelerometer;
   determine an acceleration variance by comparing the first trackpad acceleration to a target acceleration;
   use the acceleration variance to adjust the driving signal for the haptic actuator to an adjusted driving signal; and
   drive the haptic actuator with the adjusted driving signal to cause a second trackpad acceleration in the trackpad different from the first trackpad acceleration.

2. The computing device of claim 1, wherein the instructions are executable to:
   determine that the acceleration variance is outside an acceleration tolerance range of the target acceleration; and
   at least on condition that the acceleration variance is outside the acceleration tolerance range, use the acceleration variance to adjust the driving signal for the haptic actuator to the adjusted driving signal.

3. The computing device of claim 1, wherein using the acceleration variance to adjust the driving signal comprises increasing or decreasing an acceleration scaling factor by an acceleration step value.

4. The computing device of claim 1, wherein the instructions are executable to receive a touch input at a selected subregion in an array of subregions of a touch surface of the trackpad, and using the acceleration variance to adjust the driving signal comprises adjusting the driving signal associated with the selected subregion where the touch input is received.

5. The computing device of claim 4, wherein the touch input is a first touch input, and driving the haptic actuator with the adjusted driving signal is performed on condition of receiving a second touch input at the selected subregion in the array of subregions of the touch surface.

6. The computing device of claim 1, wherein the instructions are executable to:
   determine a touch force of a touch input received by the trackpad; and
   at least on condition that the touch force does not exceed a threshold touch force, refrain from driving the haptic actuator.

7. The computing device of claim 1, wherein the instructions are executable to:
   determine a touch force of a touch input received by the trackpad, wherein adjusting the driving signal for the haptic actuator further comprises using the touch force to adjust the driving signal.

8. The computing device of claim 7, wherein the instructions are executable to:
   determine a touch force variance by comparing the touch force to a target touch force;
   determine that the touch force variance is outside a touch force tolerance range of the target touch force; and
   at least on condition that the touch force variance is outside the touch force tolerance range, use the touch force to adjust the driving signal for the haptic actuator to the adjusted driving signal.

9. The computing device of claim 7, wherein using the touch force to adjust the driving signal comprises mapping the touch force to a touch force scaling factor using a machine learning algorithm.

10. The computing device of claim 9, wherein the instructions are executable to train the machine learning algorithm with at least the touch force and the second trackpad acceleration, and with additional touch forces of additional touch inputs and their corresponding resulting accelerations to converge actual trackpad accelerations toward the target acceleration.

11. The computing device of claim 7, wherein the instructions are executable to receive the touch input at a selected subregion in an array of subregions of a touch surface of the trackpad, and wherein using the touch force to adjust the driving signal comprises adjusting the driving signal associated with the selected subregion where the touch input is received.

12. A method for adjusting a driving signal for a haptic trackpad in a computing device, the method comprising:
    driving a haptic actuator in the computing device with the driving signal to cause a trackpad acceleration in the trackpad;
    measuring the trackpad acceleration using a signal from an accelerometer in the computing device;
    determining an acceleration variance by comparing the trackpad acceleration to a target acceleration; and
    using the acceleration variance to adjust the driving signal for the haptic actuator to an adjusted driving signal.

13. The method of claim 12, further comprising:
    determining that the acceleration variance is outside an acceleration tolerance range of the target acceleration; and
    at least on condition that the acceleration variance is outside the acceleration tolerance range, using the acceleration variance to adjust the driving signal for the haptic actuator to the adjusted driving signal.

14. The method of claim 12, wherein using the acceleration variance to adjust the driving signal comprises increasing or decreasing an acceleration scaling factor by an acceleration step value.

15. The method of claim 12, further comprising receiving a touch input at a selected subregion in an array of subregions of a touch surface of the trackpad, wherein using the acceleration variance to adjust the driving signal comprises adjusting the driving signal associated with the selected subregion where the touch input is received.

16. The method of claim 15, wherein the touch input is a first touch input, the method further comprising, on condition of receiving a second touch input at the selected subregion in the array of subregions of the touch surface, driving the haptic actuator with the adjusted driving signal.

17. The method of claim 12, further comprising:
    determining a touch force of a touch input received by the trackpad,
    wherein adjusting the driving signal for the haptic actuator further comprises using the touch force to adjust the driving signal.

18. The method of claim 17, wherein using the touch force to adjust the driving signal comprises mapping the touch force to a touch force scaling factor using a machine learning algorithm.

19. The method of claim 18, further comprising training the machine learning algorithm with at least the touch force and the trackpad acceleration, and with additional touch forces of additional touch inputs and their corresponding resulting accelerations to converge actual trackpad accelerations toward the target acceleration.

20. A computing device, comprising:
    a trackpad comprising a printed circuit board;
    an accelerometer affixed to the printed circuit board;
    a haptic actuator coupled to the trackpad;
    a processor; and
    a memory storing instructions executable by the processor to:
        receive a first touch input at a selected subregion in an array of subregions of a touch surface of the trackpad;
        determine a touch force of the first touch input;
        at least on condition that the touch force exceeds a threshold touch force, use a driving signal associated with the selected subregion to drive the haptic actuator to cause a first trackpad acceleration in the trackpad;
        measure the first trackpad acceleration using a signal from the accelerometer;
        determine an acceleration variance by comparing the first trackpad acceleration to a target acceleration;
        use the acceleration variance to adjust the driving signal associated with the selected subregion to an adjusted driving signal;
        receive a second touch input at the selected subregion in the array of subregions of the touch surface; and
        at least on condition of receiving the second touch input at the selected subregion, drive the haptic actuator with the adjusted driving signal to cause a second trackpad acceleration in the trackpad different from the first trackpad acceleration.

* * * * *